United States Patent
Cui et al.

(10) Patent No.: US 11,853,540 B2
(45) Date of Patent: Dec. 26, 2023

(54) METHOD FOR INTERFACE CONTROL, ELECTRONIC DEVICE AND STORAGE MEDIUM

(71) Applicant: BEIJING XIAOMI MOBILE SOFTWARE CO., LTD., Beijing (CN)

(72) Inventors: Xuewei Cui, Beijing (CN); Jun Zhu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 22 days.

(21) Appl. No.: 17/706,452

(22) Filed: Mar. 28, 2022

(65) Prior Publication Data

US 2023/0098386 A1    Mar. 30, 2023

(30) Foreign Application Priority Data

Sep. 27, 2021 (CN) .......................... 202111138452.2

(51) Int. Cl.
   *G06F 3/04847* (2022.01)
   *G06F 3/0482* (2013.01)
   *G06F 3/14* (2006.01)

(52) U.S. Cl.
   CPC ........ *G06F 3/04847* (2013.01); *G06F 3/0482* (2013.01); *G06F 3/14* (2013.01)

(58) Field of Classification Search
   CPC ....... G06F 3/04847; G06F 3/0482; G06F 3/14
   See application file for complete search history.

(56) References Cited

U.S. PATENT DOCUMENTS

2014/0337451 A1* 11/2014 Choudhary .............. A61B 5/22
                                                        709/206
2015/0160856 A1*  6/2015 Jang .................... G06F 3/04886
                                                        715/773

(Continued)

FOREIGN PATENT DOCUMENTS

WO   WO-2017213937 A1 * 12/2017 ............. G04G 21/04
WO   WO 2017213937 A1    12/2017

OTHER PUBLICATIONS

European Patent Application No. 22165115.1, Search and Opinion dated Sep. 19, 2022, 8 pages.

(Continued)

*Primary Examiner* — Cao H Nguyen
(74) *Attorney, Agent, or Firm* — COZEN O'CONNOR (57) ABSTRACT

A method for interface control across several electronic devices having different operating system includes: starting a first application in response to a first operation; obtaining, by the first device, a first presenting interface associated with the first application in a second device based on the first application; in response to an adjust instruction on the first presenting interface, generating a second presenting interface by adjusting content and/or a layout format of the first presenting interface in the first application; and sending the second presenting interface to the second device, to instruct the second device to generate and display a third presenting interface based on the second presenting interface. A first electronic device such as a mobile device or laptop may have a strong processing capability, and an auxiliary electronic device, such as a watch or other wearable device, may have a different operating system depending on its application.

16 Claims, 6 Drawing Sheets

(56) References Cited

U.S. PATENT DOCUMENTS

2016/0358311 A1* 12/2016 Chen .................... G06F 3/0488
2017/0053542 A1*  2/2017 Wilson .................... G09B 5/02
2017/0322711 A1* 11/2017 Robinson ............ G06F 3/04817
2018/0314391 A1  11/2018 Beerana et al.
2019/0121300 A1   4/2019 Peterson et al.

OTHER PUBLICATIONS

Demarest, A.A. "How to change and customize the face of your Apple Watch" Business Insider, Feb. 15, 2019, 9 pages.
Macworld UK "Image for How to change Apple Watch faces", Feb. 2, 2019, 2 pages.

* cited by examiner

METHOD FOR INTERFACE CONTROL, ELECTRONIC DEVICE AND STORAGE MEDIUM

CROSS-REFERENCE TO RELATED APPLICATION

This present application claims the benefits of priority to and Chinese Patent Application No. 202111138452.2, filed on Sep. 27, 2021, the contents of which are incorporated herein by reference in their entireties for all purposes.

TECHNICAL FIELD

The present disclosure relates to a field of interface control technology in electronic device, and particularly to an interface control method, an interface control apparatus, an electronic device and a storage medium.

BACKGROUND

When performing interface control across several electronic devices, it is difficult to perform interface control due to different operating systems between the electronic devices, especially between an electronic device with a strong processing capability such as a mobile device or laptop, and an auxiliary electronic device linked to the electronic device, such as a watch or other wearable device. The electronic device and the auxiliary electronic device often have different operating systems due to the particular application and function of the auxiliary electronic device. This makes interface control across electronic devices difficult to perform.

SUMMARY

The disclosure provides a method and an apparatus for interface control, a device and a storage medium.

According to embodiments of the present disclosure, a method for interface control is provided. The method is performed by a first device. The method includes:
  starting a first application in response to a first operation;
  obtaining, by the first device, a first presenting interface associated with the first application in a second device based on the first application;
  in response to an adjust instruction on the first presenting interface, generating a second presenting interface by adjusting content and/or a layout format of the first presenting interface in the first application; and
  sending the second presenting interface to the second device, to instruct the second device to generate and display a third presenting interface based on the second presenting interface.

According to embodiments of the present disclosure, a method for interface control is provided. The method is performed by a second device. The method includes:
  in response to a first operation instruction on a current display interface, displaying, in the display interface, at least one component object and/or at least one layout format of component objects supported by the second device; and
  in response to an adjust instruction on a component object and/or a layout format of component objects in the current display interface, selecting a component object and/or a layout format of component objects from the at least one component object and/or the at least one layout format of component objects supported by the second device, and displaying the selected component object and/or the selected layout format of component objects in the display interface.

According to embodiments of the present disclosure, a first device is provided. The first device includes: a processor; and a memory for storing instructions executable by the processor. The processor is configured to, when executing the instructions in the memory, implement the steps of the method for interface control according to the first aspect.

According to embodiments of the present disclosure, a second device is provided. The second device includes: a processor; and a memory for storing instructions executable by the processor. The processor is configured to when executing the instructions in the memory, implement the steps of the method for interface control according to the second aspect.

According to embodiments of the present disclosure, a non-transitory computer-readable storage medium is provided. A computer program is stored in the computer-readable storage medium. When a computer program stored in the computer-readable storage medium is executed by a processor of an electronic device, the electronic device is caused to implement steps of the above mentioned method for interface control.

It should be understood that the above general description and the detailed description later are only illustrative and explanatory, and do not limit the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Currently, electronic devices typically support widget technology. The widget is a function of displaying data in a form of a card, which is convenient for a user to quickly read certain life data, or quickly enter a certain application (App) entry. Currently, electronic devices that support widgets in the market include wrist watches, which are generally used together with relevant applications in mobile phones. The widgets provided users with functions such as sports statistics, weather forecast, and mobile payment, etc., so that the user can learn about the corresponding functions provided by related applications based on the watch.

Figure 1:
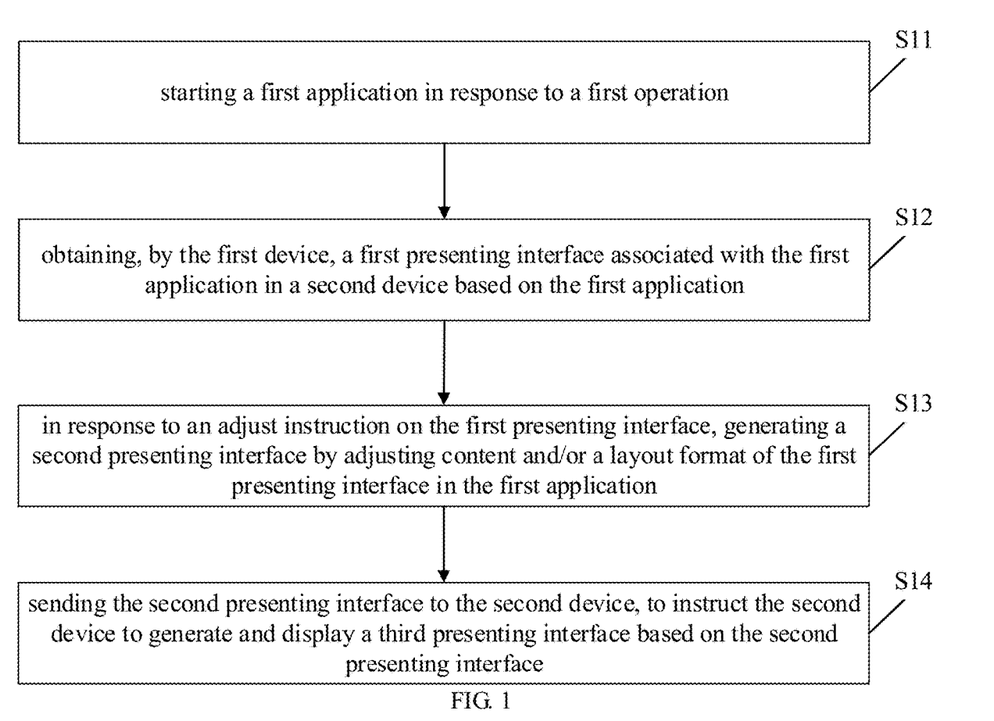
FIG. 1 is a flow chart showing a method for interface control in accordance with an embodiment of the present disclosure.

The current widgets are used on a mobile phone or displayed on a wearable device in a form of a component dials. The display form of component dial data is limited, and the number of combinations is also limited. There is no precedent to display the widgets in a form of a combination card and at the same level as the dial. At the same time, the watch end does not have a function of component management. The relevant data displayed in the component dial is quite limited and not intuitive. There is no component interaction function between the mobile phone and the wearable device. Embodiments of the present disclosure is proposed for this application scenario. FIG. 1 is a flow chart showing a method for interface control in accordance with an embodiment of the present disclosure. As illustrated in FIG. 1, the method for interface control in accordance with an embodiment of the present disclosure is applied in a first device. The method includes following steps.

At block S11, a first application is started in response to a first operation.

In some embodiments of the present disclosure, the first device may be an electronic device commonly used by a user, such as a mobile phone, a personal digital assistant, a laptop computer, and a tablet computer, and, which at least has the ability to download applications, and supports the application startup and related editing work of component objects.

The first application is a component application downloaded through a cloud server, a web page, or an application store, etc. The first application includes a large number of components and layout formats (cards) of the components. These layout formats can be selected by a user to adjust a layout format of component objects at a second device side. The first application also supports performing operations such as replacement, deletion, modification, sorting on the component objects. After a user operation on the component objects is detected, a presenting interface of the second device is updated in real time in the first application, so as to realize the updating of the presenting interface of the second device.

The second device may be a wearable device such as a wristwatch, a phone watch, a monitor instrument, etc., which generally has insufficient processing capability, and needs to cooperate with the first device to monitor the user's a motion state, a monitoring state, and the like.

At block S12, the first device obtains a first presenting interface associated with the first application in the second device based on the first application.

The technical solutions in the embodiments of the present disclosure are suitable for a scenario where an operating system of the second device is different from an operating system of the first device. Typically, for a wearable second electronic device, etc., considering cost and processing capability of a processor, an operating system supported by the wearable second electronic device is different from an operating system supported by an electronic device such as a mobile phone. With the embodiments of the present disclosure, by establishing a communication link between different systems and setting up corresponding data communication channels between different systems, free data conversion of data between different systems can be realized, so as to support mutual control of interfaces between electronic devices with different systems, which greatly facilitates the convenience of the user in using the second device.

After the first application is started by the user, the first application may obtain a current interface presenting component objects of the second device through the communication connection between the first device and the second device. That is, what kinds of layout formats of component objects the second device currently include, and situations of component objects in various layout formats, and the like, may be learnt.

After the component objects of the second device and a layout format of the component objects are learnt through the first application, the user can adjust the layout format of the component objects according to a display interface of the second device and the user's own usage habits, or, the user can update the component objects for the second device according to actual monitoring demands. For example, when the second device only contains component objects for monitoring outdoor sports states, the user can add component objects for monitoring indoor sports state, or add other component objects that the user is interested in, so as to facilitate the user to know the relevant data provided by the component objects based on the second device or the first device.

The first presenting interface is layout formats of the component objects currently supported by the second device, and the component objects included in each layout format, and the like.

At block S13, in response to an adjust instruction on the first presenting interface, a second presenting interface is generated by adjusting content and/or a layout format of the first presenting interface in the first application.

In embodiments of the present disclosure, S13 may include the following.

At least one component object supported by the first application is invoked in response to a second operation on the first presenting interface is detected. A selection instruction for the at least one component object supported by the first application is received. A component object in the first presenting interface is replaced with a selected component object when the first presenting interface is filled with component objects. When a spare component object position exists in the first presenting interface, the selected component object is added to the spare component object position in the first presenting interface. In response to a first operation instruction for a component object in the first presenting interface, the component object in the layout format of the first presenting interface is deleted. It can be understood that, the first presenting interface being filled with component objects means that all component object positions in the first presenting interface are filled with component objects, and there is no spare component object position in the first presenting interface.

The second operation can be a click operation on a first component object in the first presenting interface, such as a double-click operation, or a click operation through a left or right button of a mouse, etc. At this time, a list of all component objects supported by the first application may be called for the user, so that the user can select from the list to replace the first component object. After the user selects a new component object in the list, the selected component object may be used to replace the first component object in the first presenting interface. After the user selects to save the replacement result, the first application of the first device updates the updated first presenting interface to the second device, so that the component object replacement operation for the second device of the first device can be reflected in the second device in time, which is convenient for the second device to provide corresponding data service for the user based on the updated component object. The first operation instruction is generated after a deletion operation on the component object is detected. The deletion operation may be selecting the component object and then sliding up, or may be performing a set operation on the component object, such as a double-click.

As an implementation, at least one component object layout format supported by the first application in response to detecting a third operation on the first presenting interface. A selection instruction for the at least one component object layout format supported by the first application is received, and a selected layout format is added to the first presenting interface. A selection instruction for the at least one component object supported by the first application is received. A component object in the first presenting interface is replaced with a selected component object when the first presenting interface is filled with component objects. When a spare component object position exists in the first presenting interface, the selected component object is added to the spare component object position in the first presenting interface. In response to a first operation instruction for a component object in the first presenting interface, the component object in the layout format of the first presenting interface is deleted.

In some embodiments of the present disclosure, when the second device restores the factory settings or does not download the layout format of the relevant component objects, the user can directly select a layout format of the component objects for the second device based on the first application, and can add a corresponding component object in the selected layout format of the component objects for the second device, and the selected layout object is updated into the second device, with a manner same as the aforementioned manner for modifying the component objects.

At block S14, the second presenting interface is sent to the second device, to instruct the second device to generate and display a third presenting interface based on the second presenting interface.

In some embodiments of the present disclosure, content of an original presenting interface of the first application of the second device is same as content of the first presenting interface. Content of the third presenting interface is same as content of the second presenting interface. The same here does not mean that the display size is the same. The display size may be adapted to the display interface.

In some embodiments of the present disclosure, when updating of a component object and/or a component object layout format in the first application is detected, the updated component object and/or the updated component object layout format is sent to the second device.

In an embodiment, when the user selects a new component object layout format and adjusts the corresponding presentation format of the component objects in the original layout format, or the user merely replaces some component objects in the first presenting interface, or when the user adds a new layout format for the second device and adds a new component object in the new layout format, after the user selects to save the updated layout format and/or the updated component objects, the first device may sends the updated layout format and/or the updated component object to the second device based on the communication link between the first device and the second device, so that the second device can update the local layout format and/or the component objects. The second device provides the user with related data services based on the current component objects. The data services includes collecting the monitored data, acquiring real-time data of a network server, and the like. The monitored data may be the user's exercise data, including various data related to running, skating, swimming, etc., or may be data related to weather forecasts and key news, or may be interfaces provided for some applications, such as payment interfaces of WeChat, Alipay, and the like. The payment interfaces can provide users with corresponding payment QR codes, which are convenient for the users to obtain relevant data of corresponding applications based on the second device, improving user experience.

In some embodiments of the present disclosure, the adjustment of the component objects and/or the layout format in a display interface of the second device may also be controlled by setting a switch for interface adjustment. That is, in order to avoid a misoperation on the display interface of the second device performed by the first application in the first device, a corresponding switch can be set for the adjustment of the display interface of the second device. By turning off the adjustment of the display interface of the second device, the first device can respond to detecting an interface adjustment-forbidding instruction, and the first application of the first device is forbidden from responding to an interface adjustment instruction or an operation for the second device, and the display interface of the second device is not adjusted. The first device may also trigger the switch that used for its own interface adjustment into a turn-off state after receiving the interface adjustment-forbidding instruction of the second device, or may set the first application not to responding to the interface adjustment instruction or the operation for the second device.

Figure 2:
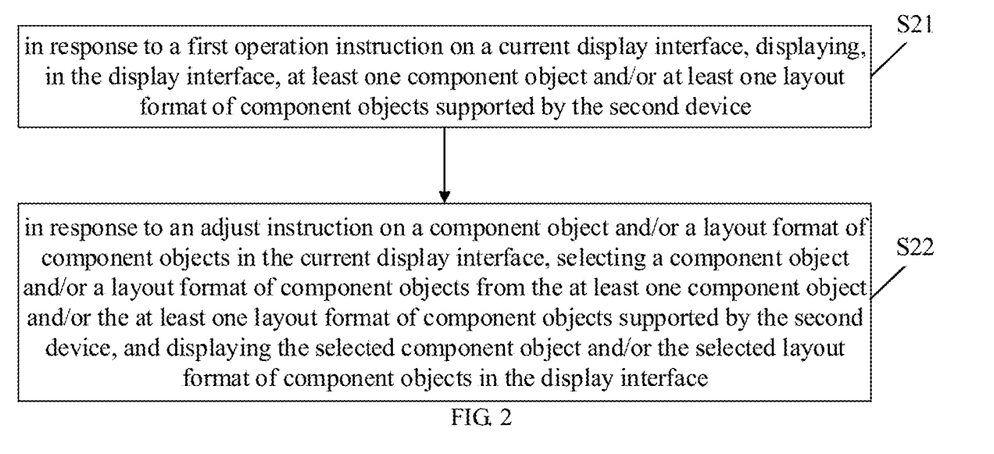
FIG. 2 is a flow chart showing a method for interface control in accordance with an embodiment of the present disclosure.

FIG. 2 is a flow chart showing a method for interface control in accordance with an embodiment of the present disclosure. As illustrated in FIG. 2, the method for interface control in accordance with an embodiment of the present disclosure is applied in a second device. The method includes following steps.

At block S21, in response to a first operation instruction on a current display interface, at least one component object and/or at least one layout format of component objects supported by the second device is displayed in the display interface.

The technical solutions in the embodiments of the present disclosure are suitable for a scenario where an operating system of the second device is different from an operating system of the first device. Typically, for a wearable second electronic device, etc., considering cost and processing capability of a processor, an operating system supported by the wearable second electronic device is different from an operating system supported by an electronic device such as a mobile phone. With the embodiments of the present disclosure, by establishing a communication link between different systems and setting up corresponding data communication channels between different systems, free data conversion of data between different systems can be realized, so as to support mutual control of interfaces between electronic devices with different systems, which greatly facilitates the convenience of the user in using the second device.

In some embodiments of the present disclosure, the first operation instruction may be an instruction generated based on a double-click operation or a sliding operation on the display interface of the second device. At this time, it means that the user wants to edit the component objects or their layout format in the second device. The generation of the first operation instruction may also be set to detecting other operations, such as a gesture operation for the second device, a long-press operation on the display interface of the second device, etc. When the first operation instruction is detected, the at least one component object and/or at least one layout format of component objects supported by the second device are displayed in the display interface, to facilitate the user to modify and update the component objects and their layout format in the current display interface.

At block S22, in response to an adjust instruction on a component object and/or a layout format of component objects in the current display interface, a component object and/or a layout format of component objects is selected from the at least one component object and/or the at least one layout format of component objects supported by the second device, and the selected component object and/or the selected layout format of component objects is displayed in the display interface.

In some embodiments of the present disclosure, the adjustment instructions may be replacement, adding, modification and sorting of the component objects and/or the layout format of component objects. When the user adjusts a component object and/or a layout format of component objects, the adjusted component object and/or layout format of component objects can be saved locally. The update result of the component objects and/or the layout formats of the component objects of the second device can be sent to the first application of the first device in real time, or the current component objects and their layout format can be sent to the first device when the first application calls the first presenting interface of the second device.

In some embodiments of the present disclosure, in response to a second operation instruction for a currently displayed component object, the currently displayed component object in the layout format in the display interface is deleted. In response to a third operation instruction for a currently displayed layout formation of component objects, the currently displayed layout formation of component objects is switched or deleted. The second operation instruction is generated after a deleting operation for a component object is detected. The deleting operation may be sliding upward after selecting a component object, or performing a set operation on the component object, such as double clicking. The third operation instruction refers to a switching or deleting instruction for a layout format of component objects. When the switching or deleting operation for the current layout format of component objects is detected, the current layout format is deleted and a new layout format is provided for the user to choose.

In some embodiments of the present disclosure, when a second presenting interface sent by the first device is received, the display interface in the second device is updated with the second presentation interface, or an updated component object and/or an updated layout format of component objects sent by the first device is received, and a local component object and/or a local layout format of component objects in the second device is updated with the updated component object and/or the updated layout formation of component objects. That is, after the user provides the first device to edit the component object and/or the layout format of component objects of the second device, the edited and updated component object and/or the edited and updated layout format of component objects is sent to the second device to be saved in the second device, realizing the update of the component object and/or the layout format of component objects of the second device.

In some embodiments of the present disclosure, the adjustment of the component objects and/or the layout format in the display interface of the second device may also be controlled by setting a switch for interface adjustment. In this way, misadjustment of the display interface caused by the user's misoperation on the second device can be avoided. When the user sets the switch for interface adjustment to off, an interface adjustment-forbidding instruction is generated, so that the second device does not respond to the operation or instruction for interface adjustment. In some embodiments, in response to detecting the interface adjustment-forbidding instruction, the second device is forbidden from responding to an adjustment instruction or an operation for the display interface, and the second device sends the interface adjustment-forbidding instruction to the first device. As an implementation, a turn-off instruction of the switch for interface adjustment may also come from the first device. That is, after the first device sends the turn-off instruction of the switch for interface adjustment to the second device, the second device may no longer respond to the operation or instruction for interface adjustment.

The technical solutions of the embodiments of the present disclosure is further illustrated based on some examples.

Operations for the first device end to manage the component objects based on the first application may be as follows.

Figure 3:
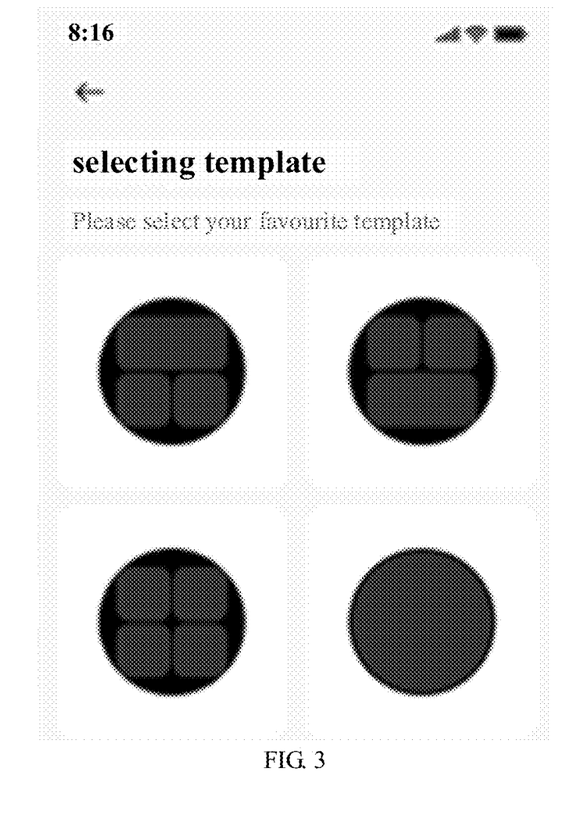
FIG. 3 is a schematic diagram showing layout formats of component objects in accordance with an embodiment of the present disclosure.

1. Management of component objects, i.e., management of widgets, is to provide a kind of editing widget layout and corresponding widgets in a second device, such as a sports watch, based on an electronic equipment such as a mobile phone, so as to facilitate a user to maintain and update the component objects in the sports watch. In some embodiments of the present disclosure, the watch widgets support four widget layout templates: two 1*1+one 1*2; one 1*2+two 1*1; four 1*1; and one 2*2. As shown in FIG. 3, a circular interface is a presenting interface of the sports watch. In FIG. 3, the presenting interface shows the layout templates of the widgets respectively, that is, layout formats of the component objects. The user can select a layout format for the component objects according to characteristics of the component objects, so that the component objects can be conveniently presented of on a presenting interface of the second device, which is convenient for the user to use.

Figure 4:
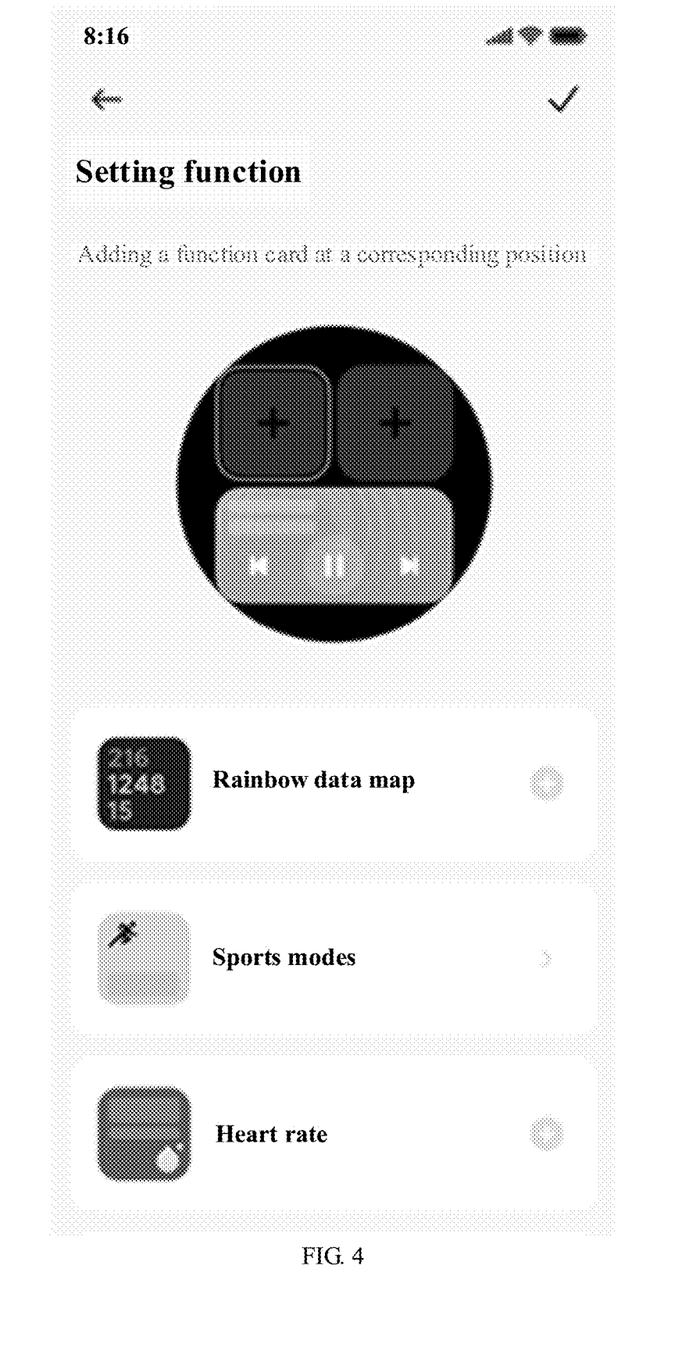
FIG. 4 is a schematic diagram showing an editing operation of component objects in accordance with an embodiment of the present disclosure.
Figure 5:
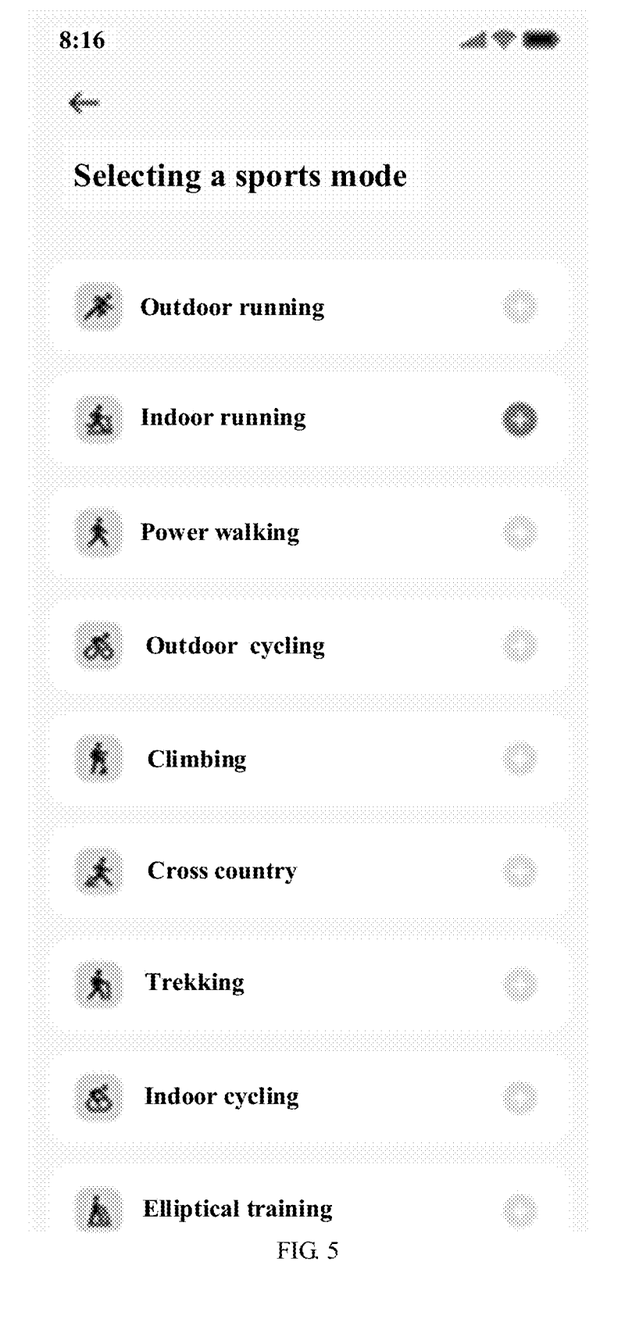
FIG. 5 is a schematic diagram showing secondary objects of a component object in accordance with an embodiment of the present disclosure.

After a template is selected, a function page for editing components is entered. A single component object is clicked, and a component list having a corresponding size may be presented in a list below. A plus sign on the right side can be clicked to add a component, as shown in FIG. 4. For example, after the user clicks on the sports mode component, a further list of sport modes for selecting can be provided for the user, based on function items supported by the component object, to display sport items supported by a corresponding firmware end, as shown in FIG. 5.

In some embodiments of the present disclosure, the setting function of the widgets in the second device can be realized through the first device, such as a mobile phone terminal, and the like, and through a widget application of the first device, so that a function of quickly adding and deleting widgets can be provided for the user. On the page layout, preview images are placed in the middle of the page, and a list of components that can be added is below. A preview effect can be viewed in real time after a component is added, and a real effect of the widgets on the watch is simulated. Thus, the experience is fast and intuitive, and the operation efficiency is high.

The technical solutions of the embodiment of the present disclosure also supports directly utilizing the second device to manage the component objects and layout formats of the component objects, as follows:

1. A user can long press any widget page in for 2 seconds on a display interface of the second device, such as a sports watch, to enter an editing mode.
2. The widget editing mode supports editing components, deleting components, sorting components, adding components and the like. The user can swipe to view all current component pages. 1) Editing component: the user can click to select a component to edit. 2) Deleting component: a component is deleted by sliding the component up. 3) Sorting component: an arrow at the bottom of the screen is clicked to sort the components. 4) Adding component: a component is kept sliding to the rightmost of the sorting, and "Adding widget" is clicked.
3. Adding a widget includes the following. 1) A template selection page is entered after the user clicks the adding widget. The watch widgets support four widget layout templates: two 1*1+1 1*2; one 1*2+2 1*1; four 1*1; one 2*2. The user can swipe up or down or scroll the watch crown to view the component templates, and can click to confirm a component template, as shown in FIG. 3. 2) A module to be added is selected by a clicking in the confirmed template, a list of optional components is entered. 3) Related component objects supported by the second device in the optional component list are sorted by category and function. The user can swipe up or down or scroll the crown to view the list and click a component to select. In some embodiments of the present disclosure, when one functional category has more than three optional components, the redundant components are incorporated into a secondary page, and the user can click the secondary entry to enter the selection, such as the sports items shown in FIG. 5 and the like. This is only an example, and is not intended to limit the technical solutions of the embodiments of the present disclosure. 4) After all the templates of the component objects are selected, a confirmation button may appear at the bottom of the display interface. The user can click the button to confirm the template and return to the editing level. 5) The user can press the crown lightly in the editing level to go back to a watch dial level and use the current widget.
4. Editing a widget includes the following. The user selects any component at the component editing level to enter a template editing page. The rest of the steps are the same as steps 2)-5) of adding a widget.
5. Delete a widget includes: sliding up any widget in the editing state, a deletion confirm button appearing when releasing the widget, and clicking the button to delete the component, or swiping down to cancel the operation.

The above examples only show an implementation manner, and is not a limitation to the technical solutions of the embodiments of the present disclosure.

In the technical solution of the embodiments of the preset disclosure, the user can manage the widgets at both the second device such as a sports watch and the first device such as mobile phone at the same time. The sports watch can edit the widgets independently of the mobile phone. At the same time, the mobile phone can simulate the combination of components at the watch end, determine a widget template for the sports watch, and update it into the sports watch, realizing the remote widget editing of the sports watch. The technical solution of the embodiments of the present disclosure provides the user with better convenience in work and life, and improves the editing operation efficiency of component objects in the second device.

In some embodiments of the present disclosure, the first device and the second device may be electronic devices of the same type, for example, the first device may be a watch, and the second device may be a mobile phone.

According to a first aspect of embodiments of the present disclosure, a method for interface control is provided. The method is performed by a first device. The method includes:
 starting a first application in response to a first operation;
 obtaining, by the first device, a first presenting interface associated with the first application in a second device based on the first application;
 in response to an adjust instruction on the first presenting interface, generating a second presenting interface by adjusting content and/or a layout format of the first presenting interface in the first application; and
 sending the second presenting interface to the second device, to instruct the second device to generate and display a third presenting interface based on the second presenting interface.

In some embodiments, content of an original presenting interface of the first application of the second device is same as content of the first presenting interface, and content of the third presenting interface is same as content of the second presenting interface.

In some embodiments, adjusting the content and/or the layout format of the first presenting interface in the first application includes:
 invoking at least one component object supported by the first application in response to detecting a second operation on the first presenting interface;
 receiving a selection instruction for the at least one component object, and replacing a component object in the first presenting interface with a selected component object in response to the first presenting interface being filled with component objects; in response to a spare component object position existing in the first presenting interface, adding the selected component object to the spare component object position in the first presenting interface; and
 in response to a first operation instruction for a component object in the first presenting interface, deleting the component object in the layout format of the first presenting interface.

In some embodiments, adjusting the content and/or the layout format of the first presenting interface in the first application includes:
 invoking at least one component object layout format supported by the first application in response to detecting a third operation on the first presenting interface;
 receiving a selection instruction for the at least one component object layout format, and adding a selected layout format to the first presenting interface;
 receiving a selection instruction for the at least one component object supported by the first application, and replacing a component object in the first presenting interface with a selected component object in response to the first presenting interface being filled with component objects; in response to a spare component object position existing in the first presenting interface, adding the selected component object to the spare component object position in the first presenting interface; and in response to a first operation instruction for a component object in the first presenting interface, deleting the component object in the layout format of the first presenting interface.

In some embodiments, an operating system of the second device is different from an operating system of the first device.

In some embodiments, the method further includes:

in response to detecting a component object and/or a component object layout format in the first application being updated, sending the updated component object and/or the updated component object layout format to the second device.

In some embodiments, the method further includes:

in response to detecting an interface adjustment-forbidding instruction, forbidding the first application of the first device from responding to an interface adjustment instruction or an operation for the second device.

According to a second aspect of embodiments of the present disclosure, a method for interface control is provided. The method is performed by a second device. The method includes:

in response to a first operation instruction on a current display interface, displaying, in the display interface, at least one component object and/or at least one layout format of component objects supported by the second device; and in response to an adjust instruction on a component object and/or a layout format of component objects in the current display interface, selecting a component object and/or a layout format of component objects from the at least one component object and/or the at least one layout format of component objects supported by the second device, and displaying the selected component object and/or the selected layout format of component objects in the display interface.

In some embodiments, the method further includes:

in response to a second operation instruction for a currently displayed component object, deleting the currently displayed component object in the layout format in the display interface;

in response to a third operation instruction for a currently displayed layout formation of component objects, switching or deleting the currently displayed layout formation of component objects.

In some embodiments, the method further includes:

receiving a second presenting interface sent by a first device, updating the display interface in the second device with the second presenting interface; or, receiving an updated component object and/or an updated layout format of component objects sent by the first device, and updating a local component object and/or a local layout formation of component objects in the second device with the updated component object and/or the updated layout formation of component objects.

In some embodiments, an operating system of the second device is different from an operating system of the first device.

In some embodiments, the method further includes:

in response to detecting an interface adjustment-forbidding instruction, forbidding responding to an adjustment instruction or an operation for the display interface, and sending the interface adjustment-forbidding instruction to the first device.

Figure 6:
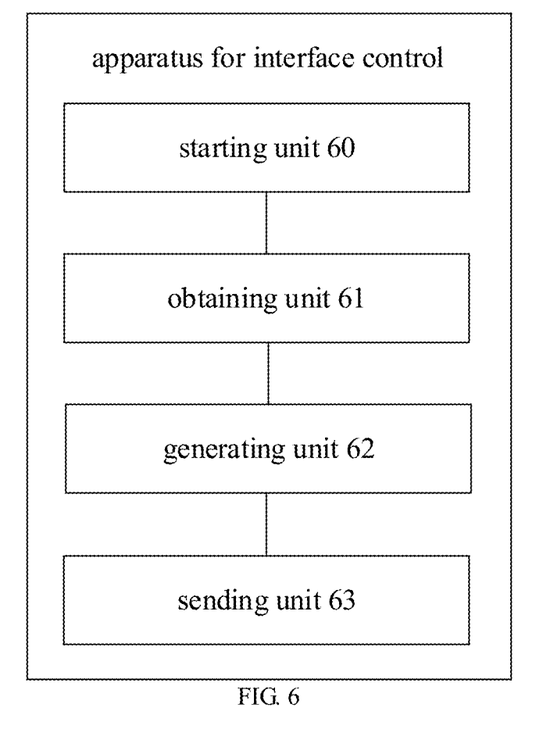
FIG. 6 is a block diagram showing an apparatus for interface control in accordance with an embodiment of the present disclosure.

FIG. 6 is a block diagram showing an apparatus for interface control in accordance with an embodiment of the present disclosure. As illustrated in FIG. 6, the apparatus for interface control in accordance with an embodiment of the present disclosure is applied in a first device. The apparatus for interface control includes a starting unit 60, an obtaining unit 61, a generating unit 62, and a sending unit 63.

The starting unit 60 is configured to start a first application in response to a first operation.

The obtaining unit 61 is configured to obtain a first presenting interface associated with the first application in a second device based on the first application.

The generating unit 62 is configured to, in response to an adjust instruction on the first presenting interface, generate a second presenting interface by adjusting content and/or a layout format of the first presenting interface in the first application.

The sending unit 62 is configured to send the second presenting interface to the second device, to instruct the second device to generate and display a third presenting interface based on the second presenting interface.

In some embodiments, content of an original presenting interface of the first application of the second device is same as content of the first presenting interface, and content of the third presenting interface is same as content of the second presenting interface.

In some embodiments, the generating unit 62 is further configured to:

invoke at least one component object supported by the first application in response to detecting a second operation on the first presenting interface;

receive a selection instruction for the at least one component object, and replace a component object in the first presenting interface with a selected component object in response to the first presenting interface being filled with component objects; in response to a spare component object position existing in the first presenting interface, add the selected component object to the spare component object position in the first presenting interface; and in response to a first operation instruction for a component object in the first presenting interface, delete the component object in the layout format of the first presenting interface.

In some embodiments, the generating unit 63 is further configured to:

invoke at least one component object layout format supported by the first application in response to detecting a third operation on the first presenting interface;

receive a selection instruction for the at least one component object layout format, and add a selected layout format to the first presenting interface;

receive a selection instruction for the at least one component object supported by the first application, and replace a component object in the first presenting interface with a selected component object in response to the first presenting interface being filled with component objects; in response to a spare component object position existing in the first presenting interface, add the selected component object to the spare component object position in the first presenting interface; and in response to a first operation instruction for a component object in the first presenting interface, delete the component object in the layout format of the first presenting interface.

In some embodiments, an operating system of the second device is different from an operating system of the first device.

On the basis of the apparatus for interface control shown in FIG. 6, the apparatus further includes a control unit.

The control unit (not shown in FIG. 6) is configured to, in response to detecting an interface adjustment-forbidding instruction, forbid from responding to an interface adjustment instruction or an operation for the second device.

In some embodiments, the starting unit 60, the obtaining unit 61, the generating unit 62, the sending unit 63 and the like can be implemented by one or more central processing units (CPUs), a graphics processing unit (GPU), a baseband processor (BP), an application specific integrated circuits (ASIC), a digital signal processor (DSP), a programmable logic device (PLD), a complex programmable logic device (CPLD), a field programmable gate array (FPGA), a general processor, a controller, a micro controller unit (MCU), a microprocessor, or other electronic components.

In some embodiments of the present disclosure, the specific mode of operations performed by each unit in the apparatus for interface control shown in FIG. 6 has been described in detail in the embodiment of the method, which will not be described in detail here.

Figure 7:
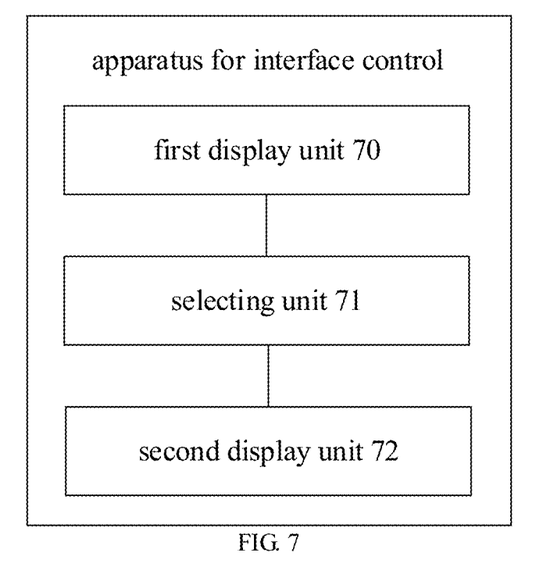
FIG. 7 is a block diagram showing an apparatus for interface control in accordance with an embodiment of the present disclosure.

FIG. 7 is a block diagram showing an apparatus for interface control in accordance with an embodiment of the present disclosure. As illustrated in FIG. 7, the apparatus for interface control in accordance with an embodiment of the present disclosure is applied in a second device. The apparatus for interface control includes a first display unit 70, a selecting unit 71 and a second display unit 72.

The first display unit is configured to, in response to a first operation instruction on a current display interface, display, in the display interface, at least one component object and/or at least one layout format of component objects supported by the second device.

The selecting unit is configured to, in response to an adjust instruction on a component object and/or a layout format of component objects in the current display interface, select a component object and/or a layout format of component objects from the at least one component object and/or the at least one layout format of component objects supported by the second device.

The second display unit is configured to display the selected component object and/or the selected layout format of component objects in the display interface.

On the basis of the apparatus for interface control shown in FIG. 7, the apparatus further includes an adjusting unit.

The adjusting unit (not shown in FIG. 7) is configured to: in response to a second operation instruction for a currently displayed component object, delete the currently displayed component object in the layout format in the display interface;

and configured to, in response to a third operation instruction for a currently displayed layout formation of component objects, switch or delete the currently displayed layout formation of component objects.

In some embodiments, the second display unit 72 is further configured to:
receive a second presenting interface sent by a first device, update the display interface in the second device with the second presenting interface; or,
receive an updated component object and/or an updated layout format of component objects sent by the first device, and update a local component object and/or a local layout formation of component objects in the second device with the updated component object and/or the updated layout formation of component objects.

In some embodiments, an operating system of the second device is different from an operating system of the first device.

On the basis of the apparatus for interface control shown in FIG. 7, the apparatus further includes a control unit and a sending unit.

The control unit (not shown in FIG. 7) is configured to, in response to detecting an interface adjustment-forbidding instruction, forbid responding to an adjustment instruction or an operation for the display interface.

The sending unit (not shown in FIG. 7) is configured to send the interface adjustment-forbidding instruction to the first device.

In some embodiments, the first display unit 70, the selecting unit 71, the second display unit 72, the control unit, and the sending unit, and the like can be implemented by one or more central processing units (CPUs), a graphics processing unit (GPU), a baseband processor (BP), an application specific integrated circuits (ASIC), a digital signal processor (DSP), a programmable logic device (PLD), a complex programmable logic device (CPLD), a field programmable gate array (FPGA), a general processor, a controller, a micro controller unit (MCU), a microprocessor, or other electronic components.

In some embodiments of the present disclosure, the specific mode of operations performed by each unit in the apparatus for interface control shown in FIG. 7 has been described in detail in the embodiment of the method, which will not be described in detail here.

The technical solution provided in embodiments of the present disclosure may include the following beneficial effects:

In the technical solution of the embodiments of the preset disclosure, a component management interface is provided for both the first device and the second device. The user can edit and modify the layout of the component objects to be presented on the second device and the specific presentation content of the component objects through the first device and the second device, and the presenting interfaces of the first device and the second device can be updated through the communication link, ensuring that the presenting interface of the second device can be updated in time in the relevant application of the first device. Through the relevant application of the first device, the component objects and their presentation in the presenting interface of the second device can also be updated in time. This greatly facilitates the convenience of the second device and improves the user experience.

Figure 8:
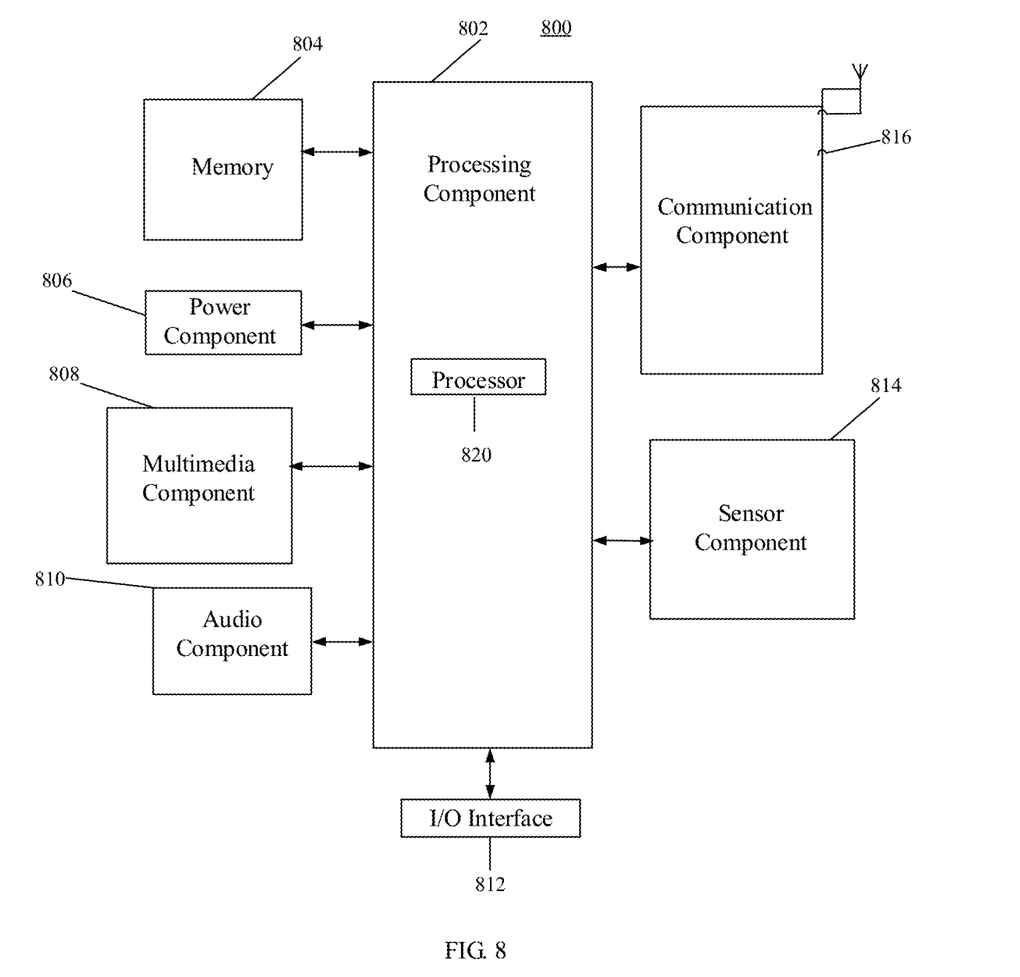
FIG. 8 is a schematic diagram showing an electronic device in accordance with an embodiment of the present disclosure.

FIG. 8 is a schematic diagram showing an electronic device in accordance with an embodiment of the present disclosure. As illustrated in FIG. 8, the electronic device supports multi-screen output, and the electronic device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the electronic device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the electronic device 800. Examples of such data include instructions for any applications or methods operated on the electronic device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the electronic device 800. The power component 806 may include a power management system, one or more power sources, and any other components associated with the generation, management, and distribution of power in the electronic device 800.

The multimedia component 808 includes a screen providing an output interface between the electronic device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the electronic device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the electronic device 800. For instance, the sensor component 814 may detect an open/closed status of the electronic device 800, relative positioning of components, e.g., the display and the keypad, of the electronic device 800, a change in position of the electronic device 800 or a component of the electronic device 800, a presence or absence of user contact with the electronic device 800, an orientation or an acceleration/deceleration of the electronic device 800, and a change in temperature of the electronic device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the electronic device 800 and other devices. The electronic device 800 can access a wireless network based on a communication standard, such as Wi-Fi, 2Q or 3Q 4G LET, 5G NR or a combination thereof. In an illustrative embodiment, the communication component 816 receives a broadcast signal or broadcast associated information from an external broadcast management system via a broadcast channel. In an illustrative embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In illustrative embodiments, the electronic device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for interface control.

The electronic device may be the above mentioned first device, or may be the second device.

In illustrative embodiments, there is also provided a non-transitory computer-readable storage medium including instructions, such as included in the memory 804, executable by the processor 820 in the electronic device 800, for performing the above-described methods for interface control. For example, the non-transitory computer-readable storage medium may be a ROM, a random access memory (SAM), a CD-ROM, a magnetic tape, a floppy disc, an optical data storage device, and the like.

It should be understood that, as used herein, the term "and/or" represents and contains any one and all possible combinations of one or more associated listed items. For example, "A and/or B" represents A alone, or B alone, or both A and B.

Other implementations of the disclosure will readily occur to those skilled in the art upon consideration of the specification and practice of the disclosure disclosed herein. This disclosure is intended to cover any variations, uses, or adaptations of this disclosure that follow the general principles of this disclosure and include common general knowledge or conventional technical means in the technical field not disclosed by this disclosure. The specification and embodiments are to be regarded as illustrative only, with the true scope and spirit of the disclosure being indicated by the following claims.

It is to be understood that the disclosure is not limited to the precise structures described above and illustrated in the accompanying drawings, and that various modifications and changes may be made without departing from the scope thereof. The scope of the present disclosure is limited only by the appended claims.

What is claimed is:

1. A method for interface control, performed by a first device, the method comprising:

starting a first application in response to a first operation;

obtaining a first presenting interface associated with the first application in a second device based on the first application;

in response to an adjust instruction on the first presenting interface, generating a second presenting interface by adjusting at least one of: content and a layout format of the first presenting interface in the first application; and sending the second presenting interface to the second device, to instruct the second device to generate and display a third presenting interface based on the second presenting interface;

wherein adjusting at least one of: the content and the layout format of the first presenting interface in the first application comprises:

invoking at least one component object supported by the first application in response to detecting a second operation on the first presenting interface: or invoking at least one component object layout format supported by the first application in response to detecting a third operation on the first presenting interface, receiving a selection instruction for the at least one component object layout format, and adding a selected layout format to the first presenting interface;

receiving a selection instruction for the at least one component object, and replacing a component object in the first presenting interface with a selected component object in response to the first presenting interface being filled with component objects: in response to a spare component object position existing in the first presenting interface, adding the selected component object to the spare component object position in the first presenting interface; and in response to a first operation instruction for a component object in the first presenting interface, deleting the component object in the layout format of the first presenting interface.

2. The method as claimed in claim 1, wherein content of an original presenting interface of the first application of the second device is same as content of the first presenting interface, and content of the third presenting interface is same as content of the second presenting interface.

3. The method as claimed in claim 1, wherein an operating system of the second device is different from an operating system of the first device.

4. The method as claimed in claim 1, further comprising:

in response to detecting at least one of: a component object and a component object layout format in the first application being updated, sending at least one of: the updated component object and the updated component object layout format to the second device.

5. The method as claimed in claim 1, further comprising:

in response to detecting an interface adjustment-forbidding instruction, forbidding the first application of the first device from responding to an interface adjustment instruction or an operation for the second device.

6. A method for interface control, performed by a second device, the method comprising:

in response to a first operation instruction on a current display interface, displaying, in the display interface, at least one of: at least one component object and at least one layout format of component objects supported by the second device; and in response to an adjust instruction on at least one of: a component object and a layout format of component objects in the current display interface, selecting at least one of: a component object and a layout format of component objects from at least one of: the at least one component object and the at least one layout format of component objects supported by the second device, and displaying at least one of: the selected component object and the selected layout format of component objects in the display interface;

wherein, in response to an adjust instruction on at least one of: a component object and a layout format of component objects in the current display interface, selecting at least one of: a component object and a layout format of component objects from at least one of: the at least one component object and the at least one layout format of component objects supported by the second device, and displaying at least one of: the selected component object and the selected layout format of component objects in the display interface, comprises:

invoking at least one component object supported by the second device in response to detecting a second operation on the current display interface: or invoking at least one component object layout format supported by the second device in response to detecting a third operation on the current display interface, receiving a selection instruction for the at least one component object layout format, and adding a selected layout format to the display interface;

receiving a selection instruction for the at least one component object, and replacing a component object in the display interface with a selected component object in response to the display interface being filled with component objects: in response to a spare component object position existing in the display interface, adding the selected component object to the spare component object position in the display interface; and in response to a fourth operation instruction for a component object in the display interface, deleting the component object in the layout format of the display interface.

7. The method as claimed in claim 6, further comprising:

in response to a second operation instruction for a currently displayed component object, deleting the currently displayed component object in the layout format in the display interface;

in response to a third operation instruction for a currently displayed layout formation of component objects, switching or deleting the currently displayed layout formation of component objects.

8. The method as claimed in claim 6, further comprising:

receiving a second presenting interface sent by a first device, updating the display interface in the second device with the second presenting interface.

9. The method as claimed in claim 6, further comprising:

receiving an updated component object and/or an updated layout format of component objects sent by the first device, and updating at least one of: a local component object and a local layout formation of component objects in the second device with the updated component object and/or the updated layout formation of component objects.

10. The method as claimed in claim 6, wherein an operating system of the second device is different from an operating system of the first device.

11. The method as claimed in claim 6, further comprising:
in response to detecting an interface adjustment-forbidding instruction, forbidding responding to an adjustment instruction or an operation for the display interface, and sending the interface adjustment-forbidding instruction to the first device.

12. A first device, comprising:
a processor; and
a memory for storing instructions executable by the processor;
wherein the processor is configured to, when executing the instructions in the memory, implement a method for interface control, the method comprising:
starting a first application in response to a first operation;
obtaining, by the first device, a first presenting interface associated with the first application in a second device based on the first application;
in response to an adjust instruction on the first presenting interface, generating a second presenting interface by adjusting at least one of: content and a layout format of the first presenting interface in the first application; and
sending the second presenting interface to the second device, to instruct the second device to generate and display a third presenting interface based on the second presenting interface;
wherein adjusting at least one of: the content and the layout format of the first presenting interface in the first application comprises:
invoking at least one component object supported by the first application in response to detecting a second operation on the first presenting interface: or invoking at least one component object layout format supported by the first application in response to detecting a third operation on the first presenting interface, receiving a selection instruction for the at least one component object layout format, and adding a selected layout format to the first presenting interface;
receiving a selection instruction for the at least one component object, and replacing a component object in the first presenting interface with a selected component object in response to the first presenting interface being filled with component objects: in response to a spare component object position existing in the first presenting interface, adding the selected component object to the spare component object position in the first presenting interface; and
in response to a first operation instruction for a component object in the first presenting interface, deleting the component object in the layout format of the first presenting interface.

13. The device as claimed in claim 12, wherein content of an original presenting interface of the first application of the second device is same as content of the first presenting interface, and content of the third presenting interface is same as content of the second presenting interface.

14. A second device, comprising:
a processor; and
a memory for storing instructions executable by the processor;
wherein the processor is configured to, when executing the instructions in the memory, implement the method for interface control as claimed in claim 6.

15. A non-transitory computer-readable storage medium having stored therein a computer program that, when executed by a processor of an electronic device, causes the electronic device to implement the method for interface control as claimed in claim 1.

16. A non-transitory computer-readable storage medium having stored therein a computer program that, when executed by a processor of an electronic device, causes the electronic device to implement the method for interface control as claimed in claim 6.

* * * * *